United States Patent
Yatsu

(10) Patent No.: US 7,106,545 B2
(45) Date of Patent: Sep. 12, 2006

(54) METHOD AND APPARATUS FOR SERVOWRITING IN A DISK DRIVE

(75) Inventor: Masahide Yatsu, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/017,236

(22) Filed: Dec. 21, 2004

(65) Prior Publication Data

US 2005/0141125 A1     Jun. 30, 2005

(30) Foreign Application Priority Data

Dec. 24, 2003  (JP) ............................. 2003-427045

(51) Int. Cl.
*G11B 21/02*  (2006.01)

(52) U.S. Cl. ........................................ 360/75

(58) Field of Classification Search ................ None
See application file for complete search history.

(56) References Cited

U.S. PATENT DOCUMENTS 6,181,500 B1 * 1/2001 Serrano et al. ............... 360/53

2004/0075935 A1    4/2004 Yatsu
2004/0160696 A1 *  8/2004 Meyer ..................... 360/77.05

FOREIGN PATENT DOCUMENTS

| JP | 8-212733    | 8/1996 |
| JP | 2001-243733 | 9/2001 |

* cited by examiner

*Primary Examiner*—Hoa T. Nguyen
*Assistant Examiner*—Mitchell Slavitt
(74) *Attorney, Agent, or Firm*—Pillsbury Winthrop Shaw Pittman, LLP

(57) ABSTRACT

An additive self-servowriting method that records a servo pattern on a disk surface in a disk drive is disclosed. A servowriting method according to the present invention writes an initial servo pattern with a head moved to the inner circumference of the disk at the initial time. Then, additive servowriting operation is performed to write an additive servo pattern with the head positioned in the outer circumferential direction of the disk. When it is impossible to continue the additive servowriting operation in the middle of the operation, the head is set back to the previous additive servo pattern to resume the additive servowriting operation.

7 Claims, 10 Drawing Sheets

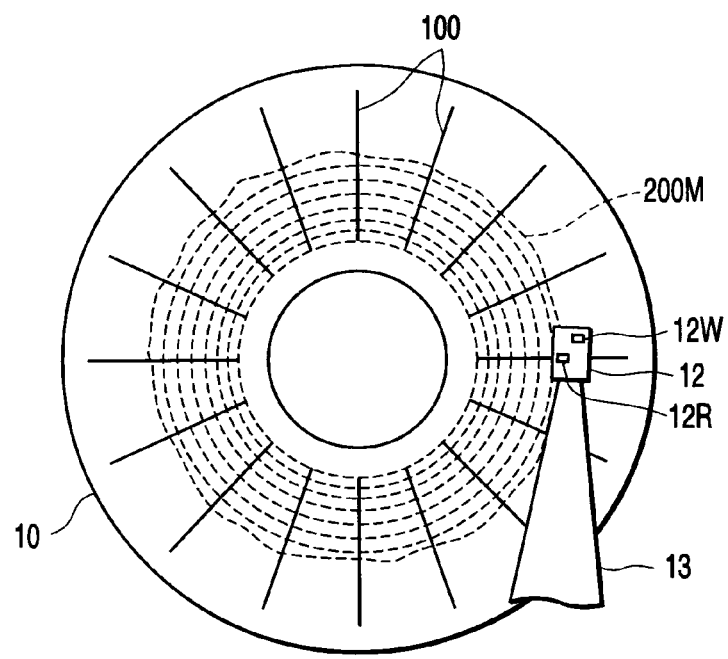
F I G. 7
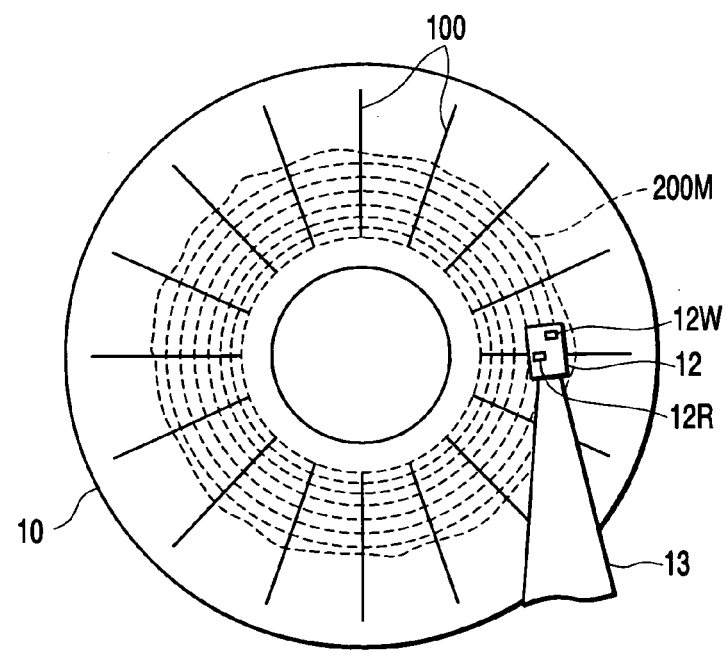
F I G. 8

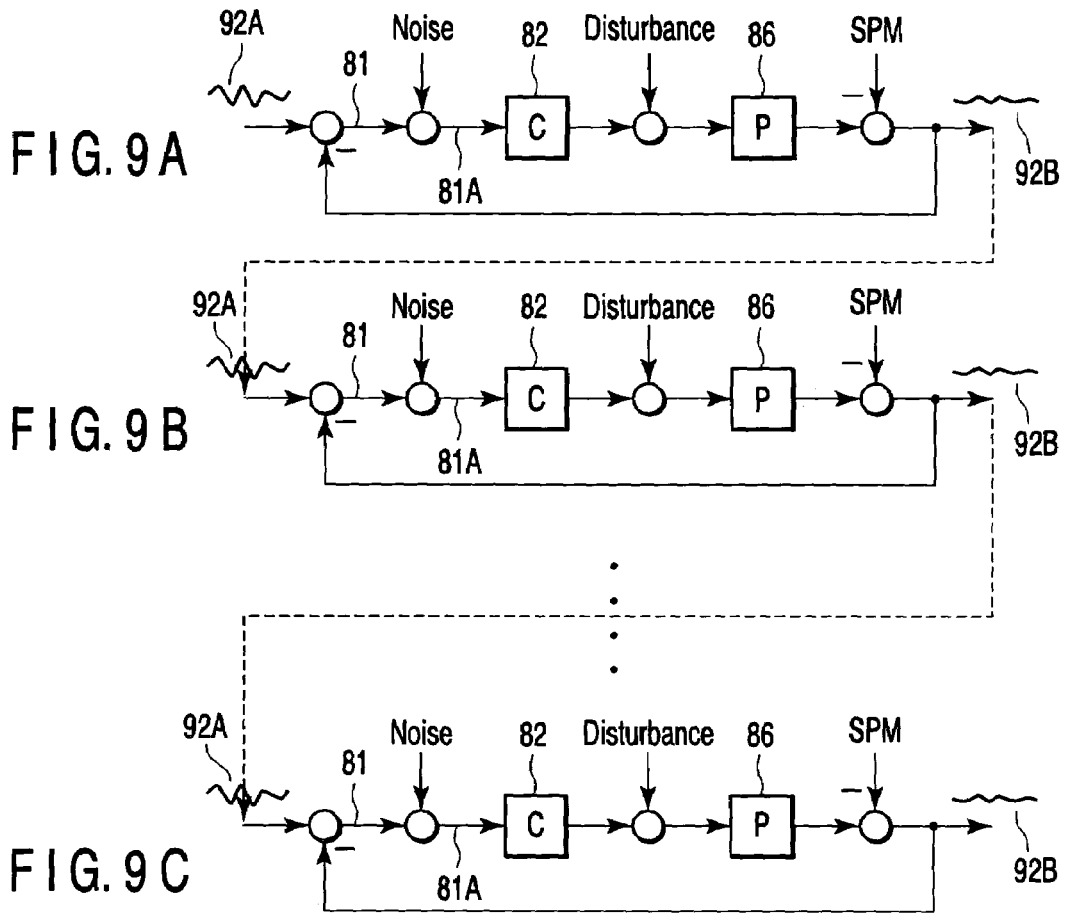
FIG. 9A
FIG. 9B
FIG. 9C
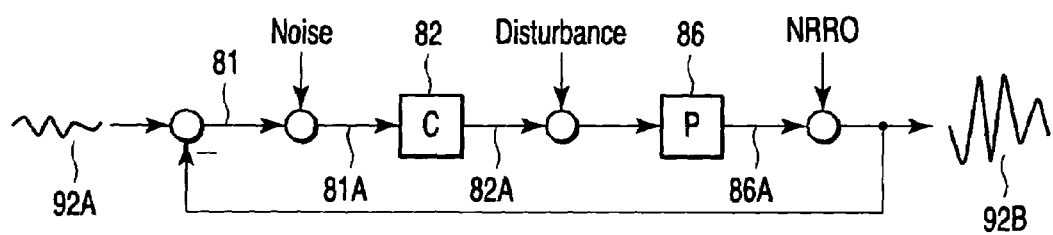
FIG. 10

METHOD AND APPARATUS FOR SERVOWRITING IN A DISK DRIVE

CROSS-REFERENCE TO RELATED APPLICATIONS

This application is based upon and claims the benefit of priority from prior Japanese Patent Application No. 2003-427045, filed Dec. 24, 2003, the entire contents of which are incorporated herein by reference.

BACKGROUND OF THE INVENTION

1. Field of the Invention

The present invention relates to the field of a disk drive, and more particularly, to a servowriting method for writing a servo pattern to a disk medium.

2. Description of the Related Art

In general, a disk drive represented by a hard disk drive is configured to write or read data to/from a disk medium by means of a magnetic head (hereinafter, referred to merely as a "head").

The disk drive incorporates a servo system that moves the head for writing or reading data to a target position (target track) on the disk medium for positioning.

The servo system, in which a microprocessor (CPU) of the disk drive serves as a main component thereof, uses servo information (servo pattern data) that has previously been written to the disk medium to perform head positioning control (servo operation).

In the disk drive, the servo pattern data is written, as a magnetic signal, to servo areas (servo sectors) arranged on the disk medium at regular intervals.

The manufacturing process of the disk drive includes a servowrite process in which the servo pattern data is written to the disk medium. As a servowriting method, a self-servowriting method is available in addition to a method of using a dedicated servowriter (or servo track writer: also referred to as an "STW").

The self-servowriting method, in which the disk drive writes the servo pattern data to the disk medium in a self-reliant manner without using an external positioning mechanism such as a positioner, is advantageous in terms of manufacturing cost. In general, the self-servowriting process is carried out in a state where a top cover is attached to the main body of the disk drive.

Of the self-servowriting methods, in particular, prior art called the additive servowriting method has been disclosed (refer to, for example, Jpn. Pat. Appln. KOKAI Publication No. 8-212733).

The additive servowriting method is a method of using a head incorporated in the disk drive to determine the timing of the disk in the disk rotation direction and the head position in the radial direction of the disk medium, thereby writing servo pattern data to the disk medium in a self-reliant manner.

The method described above is advantageous in terms of manufacturing cost. In addition, the method can write servo pattern data while constantly observing relative positions between the disk medium and head in the radial direction of the disk medium, performing the writing operation with high accuracy.

The additive servowriting method positions (performs tracking of) a read head element to the servo pattern data that has been written by a write head element included in the head, then moves the head to the writing position of next servo pattern data, and writes the next servo pattern data by means of the write head element.

In this manner, the servo pattern data are sequentially written from, for example, the innermost to outermost part of the disk medium. The servo pattern data obtained by the additive servowriting operation is referred to as an "additive servo pattern" for convenience in some cases.

In the method described above, the additive servo pattern needs to have signal quality good enough to position the read head element correctly in order to determine the next writing position. However, in a servowriting process, influence of disturbance or the like makes it difficult to write all the additive servo patterns in a good condition.

If an additive servo pattern having quality so bad as to exceed an allowable range has been written, writing accuracy in the additive servo pattern may be adversely affected, which may prevent the subsequent writing operation in practice. If the following additive servowriting operation is started again from the beginning, efficiency in the servowrite process may be decreased.

BRIEF SUMMARY OF THE INVENTION

In accordance with one embodiment of the present invention, there is provided a method for self-servowriting capable of preventing efficiency in the servowriting process from being decreased even when the additive servo pattern having quality so bad as to exceed an allowable range makes it impossible to perform the following additive servowriting operation.

The method of writing servo pattern data to a disk medium comprises the steps of: moving a head of a disk drive to an initial position on the disk medium; writing, with the write head element included in the head, initial servo pattern data onto the initial position based on the timing pattern data read from the disk medium by the read head element included in the head; performing an additive servowriting operation in which additive servo pattern data is sequentially written in such a manner that first additive servo pattern data is written with the write head element that has been positioned based on the initial servo pattern data read by the read head element, and second additive servo pattern data is written based on the first additive servo pattern data that has been written; determining whether it is impossible to continue the additive servowriting operation; interrupting the additive servowriting operation when it was determined that it is impossible to continue the additive servowriting operation; resuming the additive servowriting operation after moving the head to the position of the additive servo pattern data that has been written before the interruption; and deleting all or part of the additive servo pattern data that was being written at the time of the determination that it is impossible to continue the additive servowriting operation.

BRIEF DESCRIPTION OF THE SEVERAL VIEWS OF THE DRAWING

The accompanying drawings, which are incorporated in and constitute a part of the specification, illustrate embodiments of the invention and, together with the general description given above and the detailed description of the embodiments given below, serve to explain the principles of the invention.

FIG. 7 is a view showing a state where the writing accuracy in additive servo patterns has deteriorated in another embodiment;

FIG. 8 is a view for explaining a resumption process of the additive servowriting operation in the other embodiment;

FIGS. 9A to 9C are views showing a relationship between a conceptual configuration of the head positioning control system according to the another embodiment and disturbance;

FIG. 10 is a view for explaining a state where the writing accuracy in the additive servo patterns have deteriorated in the another embodiment;

DETAILED DESCRIPTION OF THE INVENTION

Embodiments of the present invention will be described below with reference to the accompanying drawings.

(Configuration of System)

Figure 1:
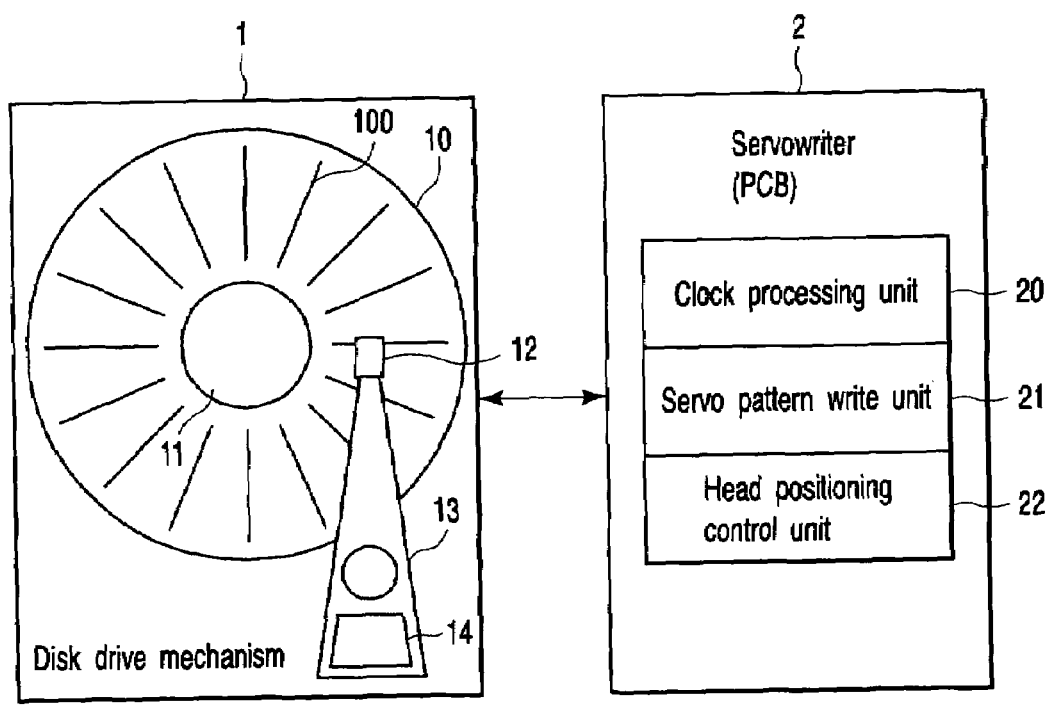
FIG. 1 is a block diagram showing main portions of a disk drive and a servowriter according to an embodiment of the present invention.

FIG. 1 is a block diagram showing main portions of a disk drive 1 and servowriter 2 according to the present embodiment.

The disk drive 1 incorporates a disk medium (hereinafter, referred to merely as a "disk") 10 which is placed and rotated on a spindle motor (SPM) 11 and a head 12 mounted on an actuator 13. The actuator 13 is a mechanism which is driven by a voice coil motor (VCM) 14 to move the head 12 in the radial direction of the disk 10.

On one surface of the disk 10, timing patterns 100 for use in detecting positions in the rotation direction of the disk 10 and determining the timing for writing servo patterns have been written. The timing patterns 100 correspond to clock patterns recorded with predetermined spaces in a circumferential direction.

The timing patterns 100 are prewritten on one surface of the disk 10 by a dedicated writing unit other than a disk drive. The disk 10 on which the timing patterns 100 have been written is incorporated in the disk drive 1.

Figure 4:
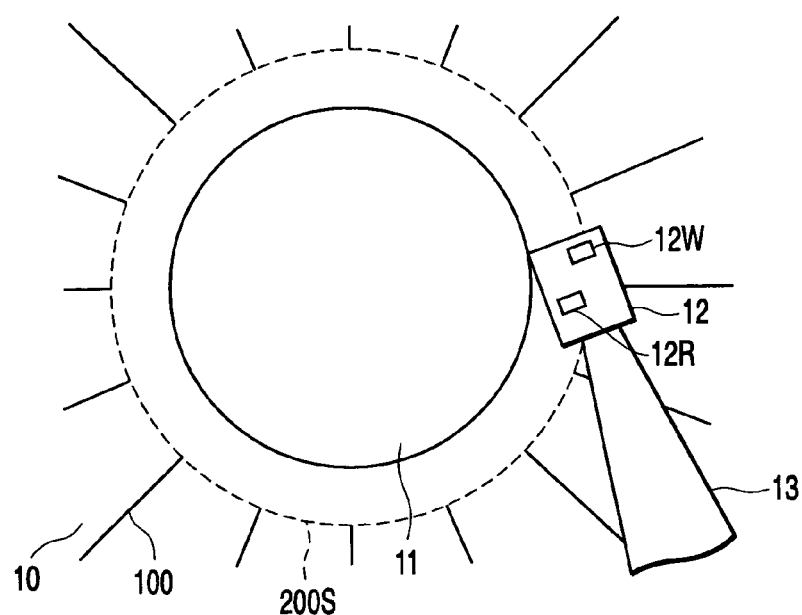
FIG. 4 is a view showing a positional relationship between a read head element and write head element in the present embodiment.

As shown in FIG. 4, the head 12 is equipped with a read head element 12R for performing a read operation and a write head element 12W for performing a write operation. The read head element 12R is relatively positioned on the inner circumferential side with respect to the write head element 12W.

The disk drive 1 includes the above-described mechanism and is sealed with a top cover attached thereto.

(Servowriter)

The servowriter 2 includes a communication function for exchanging a servo signal corresponding to the servo pattern and timing pattern read by the read head element 12R with the disk drive 1.

The servowriter 2 is constituted by a circuit (including a CPU, memory, and the like) mounted on, for example, a printed circuit board (PCB) and incorporated in the disk drive 1. Therefore, the servo pattern is written to the disk drive 1 by the self-servowriting method in the sealed state, that is, in a state of isolation from the outside world. Note that the servowriter 2 may be or may not be removed from the PCB incorporated in the disk drive 1 before shipment.

The servowriter 2 includes a clock processing unit 20, a servo pattern write unit 21, and a head positioning control unit 22. The clock processing unit 20 processes the timing pattern 100 read by the read head element 12R and detects a position of the head 12 on the disk 10 in a disk rotation direction to determine the timing for writing servo patterns.

The servo pattern write unit 21 is a circuit that supplies a servo signal for writing a servo pattern (servo information) to the disk 10 with the write head element 12W. The servo information includes a track address code (cylinder address code) for identifying tracks and a servo burst pattern for use in a positioning operation within tracks (often referred to also as "track following operation"). The servo pattern write unit 21 performs a servo pattern writing operation (additive servowriting operation) in synchronization with a signal exchanged with the clock processing unit 20 and head positioning control unit 22.

The head positioning control unit 22 controls positioning of the head 12 on the basis of the servo patterns read by the read head element 12R. The head positioning control unit 22 conceptually includes a feedback control system as shown in FIG. 6.

Figure 6:
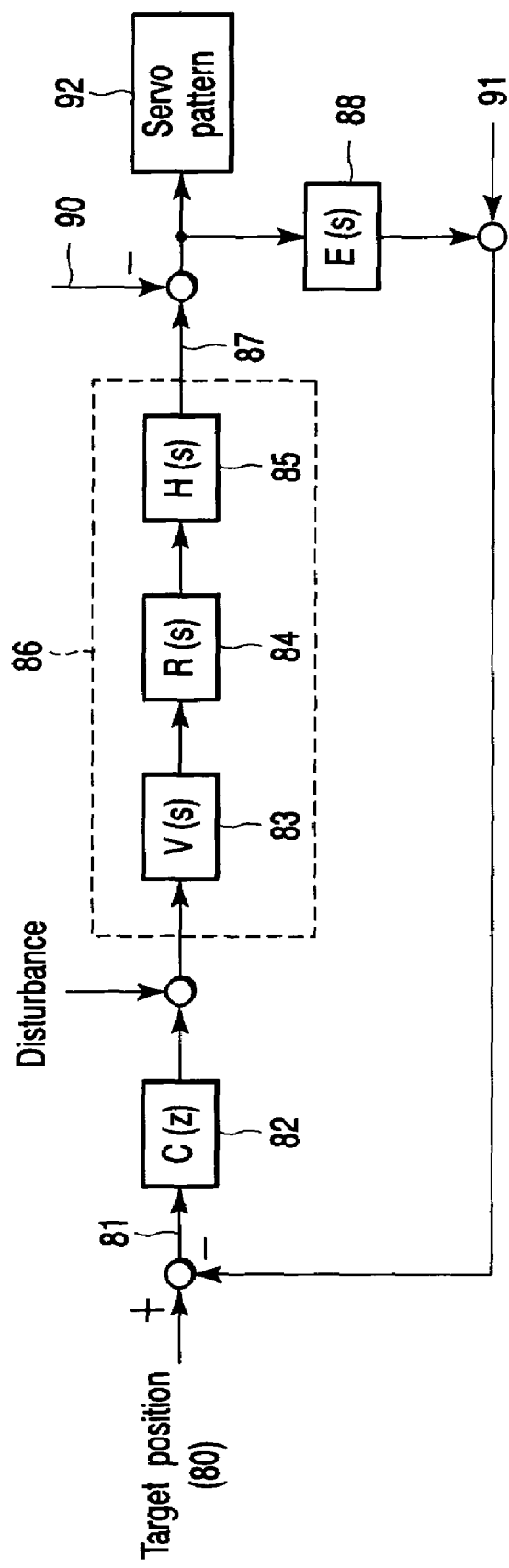
FIG. 6 is a block diagram showing a configuration of a head positioning control system of the servowriter according to the present embodiment.

That is, as shown in FIG. 6, the head positioning control unit 22 includes a controller (transfer function C [z]) 82, a head movement mechanism 86, and a position detection unit (transfer function E [s]) 88.

The controller 82 calculates the manipulated variable so as to resolve a positional error between a target position 80 of a head 85 and a detected position (actually including observation noise 91) observed by the position detection unit 88.

The head movement mechanism 86 displaces a head position 87 based on the manipulated variable calculated by the controller 82. The write head element at this displaced head position performs writing operation of a servo pattern 92 to the disk 10.

The servo pattern 92 to be written to the disk 10 is influenced by a disturbance 90 such as NRRO (non-repeatable runout) of the disk 10. The NRRO is disk runout that is not synchronized with the rotation of the SPM 11.

There is a possibility that various disturbances other than the NRRO be applied to the disk drive 1. To be specific, a wind disturbance generated by the rotation of the disk drive 10, an error noise generated depending on the magnetic signal quality of the servo pattern read by the read head element, and the like are conceivable.

The head movement mechanism 86 includes a VCM 83 (transfer function V [s]), an actuator 84 (transfer function R [s]), and a head 85 (transfer function H [s]).

(Method for Writing Servo Pattern)

The servowriting method according to the present embodiment performs additive servowriting operation to sequentially write servo patterns (additive servo patterns) while positioning the head 12 based on the written servo patterns. Hereinafter, a procedure of the servowriting method will be described with reference mainly to a flow-chart of FIG. 17.

Figure 2:
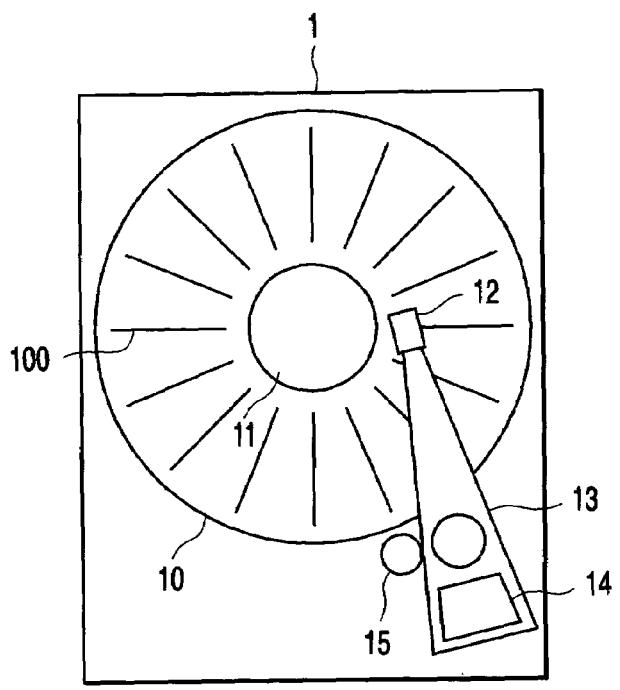
FIG. 2 is a view for explaining a servowriting procedure according to the present embodiment.

The head positioning control unit 22 of the servowriter 2 drives the VCM 14 of the drive 1 to move the actuator 13 in the inner circumferential direction of the disk 10. The head positioning control unit 22 moves the actuator 13 until the actuator 13 is in contact with a stopper 15 disposed on the inner circumferential side thereof as shown in FIG. 2. Thus, the head 12 is moved to the innermost position (initial position) of the disk 10 (step S1).

The clock processing unit 20 receives, as an input, the timing pattern 100 that has been read from the surface of the disk 10 through the read head element 12R and thereby detects the rotation speed of the disk 10 and a position in the rotation direction of the disk 10. The servo pattern write unit 21 writes the initial servo pattern to be used as a reference with the timing determined by the rotation speed and rotation direction detected by the clock processing unit 20 (step S2).

Figure 3:
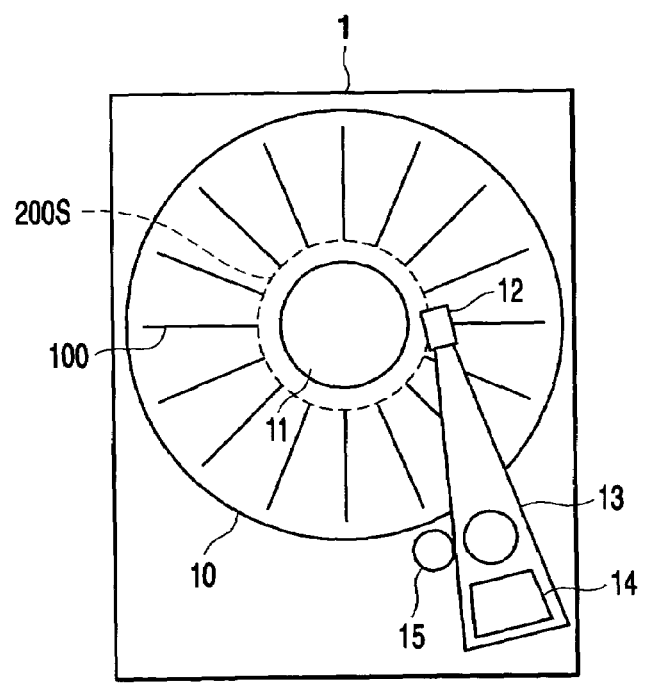
FIG. 3 is a view showing a state where the initial servo pattern has been written in the present embodiment.

That is, as shown in FIG. 3, the servo pattern write unit 21 writes an initial servo pattern 200S that runs the innermost track of the disk 10 with the write head element 12W. The initial servo pattern 200S and additive servo patterns (to be described later) are servo information including a track code (cylinder code) and servo burst pattern.

FIG. 4, which is a partially enlarged view of FIG. 3, shows a positional relationship between the read head element 12R and write head element 12W included in the head 12. The read head element 12R is relatively positioned on the inner circumferential side with respect to the write head element 12W.

In servowriting operation, a servo pattern (in this case, the initial servo pattern 200S) that has been written to the disk 10 is read by the read head element 12R. Using the read servo pattern, the head positioning control unit 22 performs a head positioning operation of the head 12 (write head element 12W) (step S3).

The servo pattern write unit 21 writes a servo pattern (additive servo pattern) having the same servo information as the initial servo pattern 200S with the positioned write head element 12W (step S4). That is, as shown in FIG. 5, the write head element 12W that has been positioned at the writing position on the outer circumferential side of the initial servo pattern 200S writes the additive servo pattern 200 (additive servowriting).

The head positioning control unit 22 then reads the written additive servo pattern 200 with the read head element 12R and positions the write head element 12W at the next writing position in the outer circumferential direction (step S5).

Figure 5:
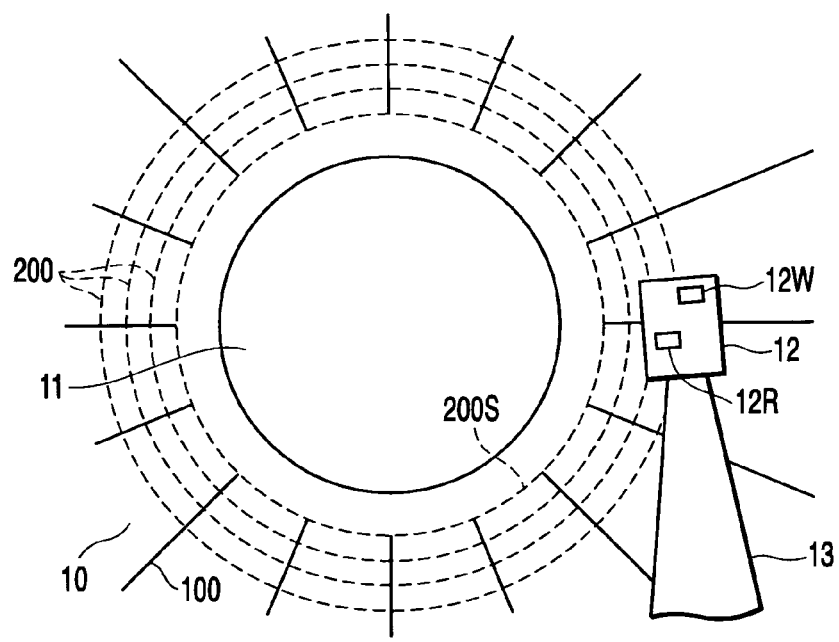
FIG. 5 is a view showing a state where additive servo patterns have been written in the present embodiment.

The write head element 12W thus positioned performs the additive servowriting to sequentially write additive servo patterns 200 in the outer circumferential direction as shown in FIG. 5. The servo patterns are written to the entire surface of the disk 10 by repetition of the above additive servowriting (Yes in step 7).

(Resumption Process of Additive Servowriting Operation)

FIGS. 11 to 16 and FIG. 18 are views for explaining a resumption process of the additive servowriting according to the present embodiment.

Figure 12:
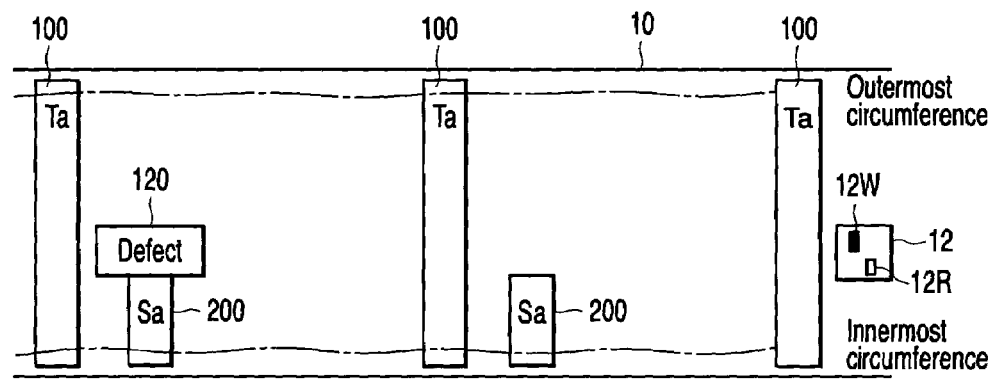
FIG. 12 is a view for explaining the existence of a defect on the disk surface in the present embodiment.

In the present embodiment, it is assumed that there exists a defect portion 120 such as a scratch on the magnetic layer of the disk 10 as described in FIG. 12 when the additive servowriting operation is being performed, in addition to deterioration in the writing accuracy due to disturbance as a factor that degrades signal quality of the additive servo patterns. The existence of the defect portion 120 as described above causes signal quality of the written additive servo pattern to deteriorate, preventing the read head element 12R from performing a correct tracking operation.

Even when the additive servowriting operation is resumed with the head 12 set back to the position of the previous additive servo pattern in the above case, normal additive servo patterns cannot be obtained since the defect portion 120 is still present on the disk surface. To cope with this problem, the servowriter 2 according to the present embodiment performs a resumption process as shown in the flow-chart of FIG. 18.

Figure 11:
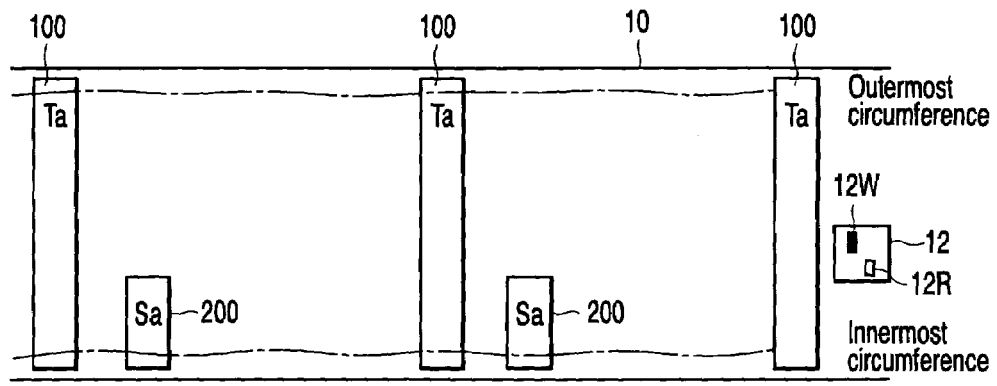
FIG. 11 is a view showing a positional relationship between a timing pattern and additive servo pattern in the present embodiment.

FIG. 11 shows a positional relationship between a timing pattern 100 and additive servo pattern 200 on the disk surface. The timing pattern 100 is so-called a reference signal for determining the writing position of the additive servo pattern 200 in the circumferential direction as shown in FIGS. 2 and 3. The timing pattern 100 is recorded at a predetermined interval called a "sector" in the disk circumferential direction and is a successive radial clock pattern signal when viewed in the disk radial direction.

The additive servo pattern 200 is servo information obtained when being written from the innermost side of the disk 10 as described above.

When the defect portion 120 exists on the disk surface as shown in FIG. 12, the servowriter 2 determines that it is impossible to continue the additive servowriting operation (Yes in step S6 shown in FIG. 17) since the read head element 12R cannot be positioned at the correct position. More specifically, the servowriter 2 determines that it is impossible to continue the additive servowriting operation in the case where the positional error generated at the positioning operation of the head positioning control unit 22 exceeds an allowable range.

Figure 18:
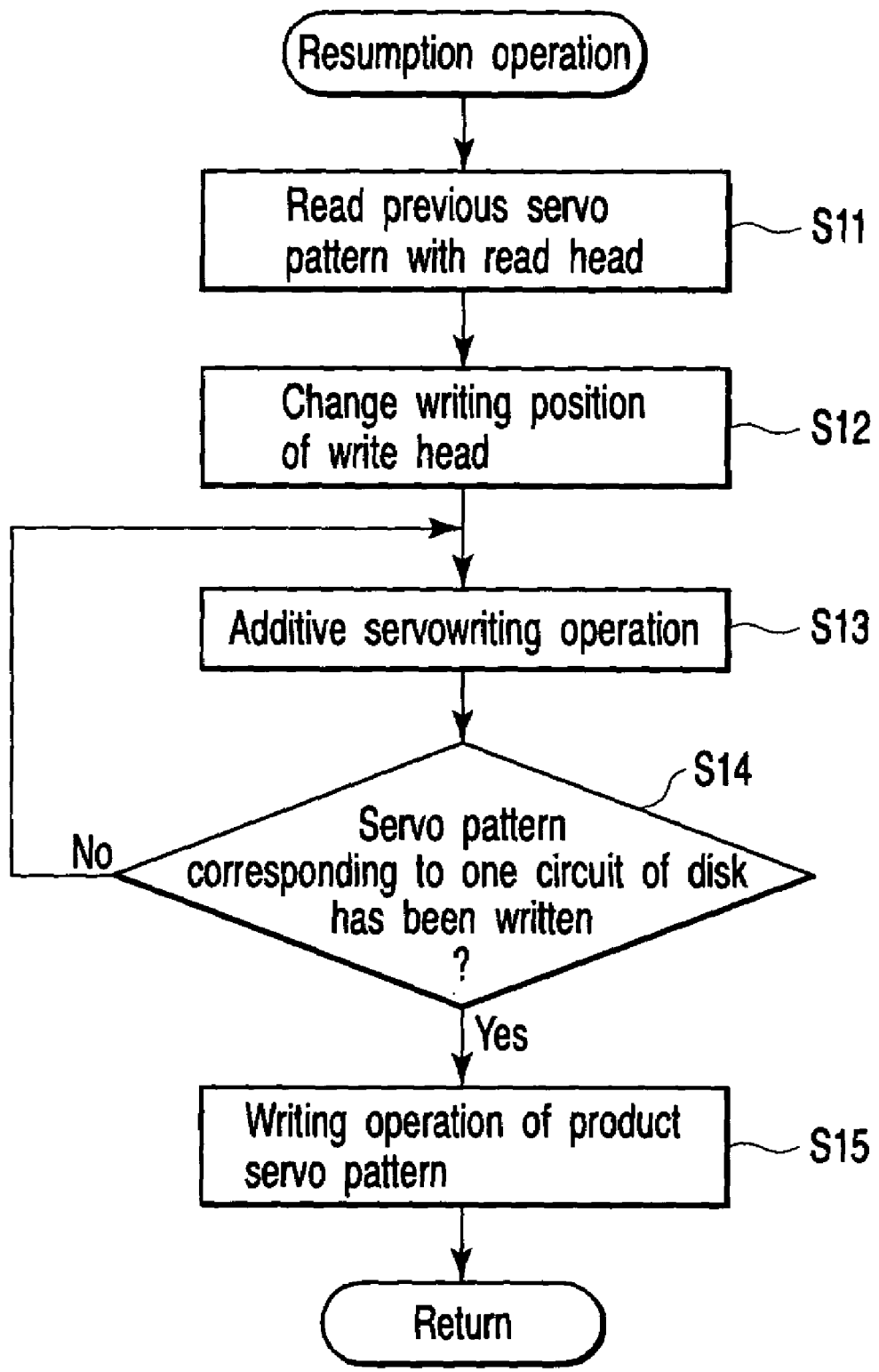

The servowriter 2 then interrupts the additive servowriting operation and sets back the position of the head 12 to the additive servo pattern 200 that was written before the determination as shown in FIG. 18 (step S11).

Next, the servowriter 2 changes the writing position of the write head element 12W in the circumferential direction (step S12) based on the timing pattern 100 that has been read by the read head element 12R. Then the servowriter 2 allows the write head element 12W to resume the additive servowriting operation for rewriting the additive servo pattern (step S13).

Figure 13:
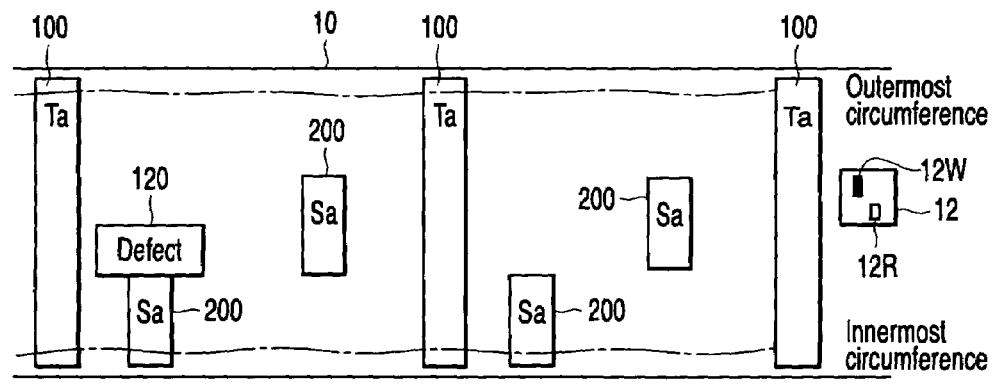
FIG. 13 is a view for explaining a procedure of a resumption process of the additive servowriting operation in the present embodiment.

Thus, as shown in FIG. 13, the resumption process of the abovementioned additive servowriting operation allows the additive servo pattern 200 to be written at the position away from the defect portion 120 in the disk circumferential direction. Since it is difficult for the servowriter 2 to correctly calculate the position of the defect portion 120 such as a scratch in practice, the servowriter 2 probabilistically resumes the additive servowriting operation by previously setting a plurality of writing timings.

Figure 14:
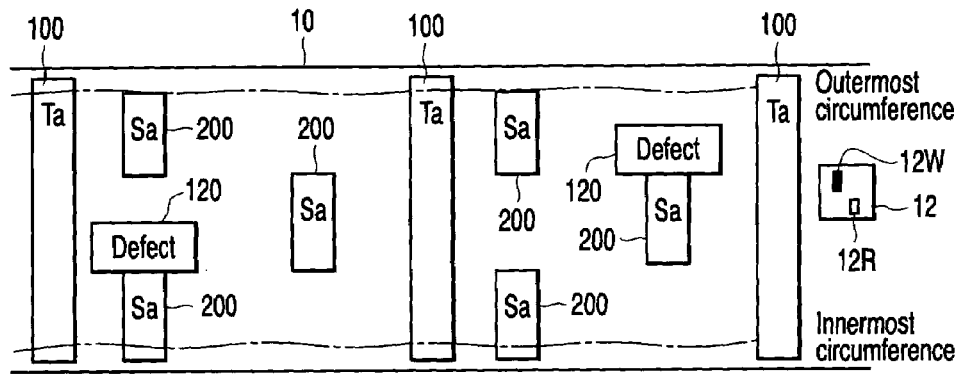
FIG. 14 is a view showing a state where the additive servo patterns have been written to the entire disk surface in the present embodiment.

Thereafter, the servowriter 2 performs the additive servowriting corresponding to one circuit of the disk to write additive servo patterns 200 including one that avoids the defect potion 120 (Yes in step S14). FIG. 14 shows a state where the additive servo patterns have been written to the entire disk surface.

When the additive servo patterns have been written to the entire surface of the disk 10 by the resumption process of the additive servowriting operation, no pattern is recorded on the defect portion 120 as shown in FIG. 14, so that the servo pattern is not aligned in the disk radial direction. This does not interfere with the additive servowriting, but causes inconvenience to the positioning operation of the head 12 when the disk drive 1 performs, as a product, read/write operation.

Figure 15:
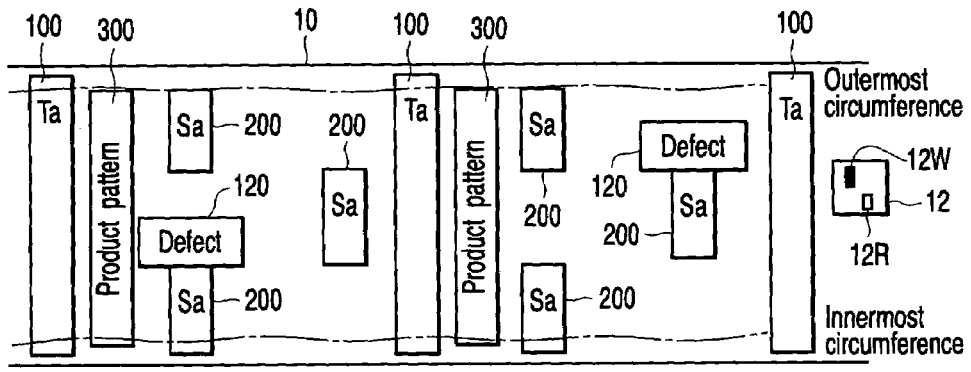
FIG. 15 is a view showing a state where product servo patterns have been written to a disk surface in the present embodiment.

As a countermeasure, the servowriter 2 writes a servo pattern (referred to as "product pattern") 300 (step S15) used at read/write operation in addition to the additive servo pattern 200 for servowriting, as shown in FIG. 15.

The servowriter 2 writes the product pattern 300 at the writing time of the additive servo pattern 200. Alternatively, the servowriter 2 writes the additive servo pattern 200 to the entire surface of the disk 10, and then writes the product pattern 300 using the additive servo pattern 200.

Figure 16:
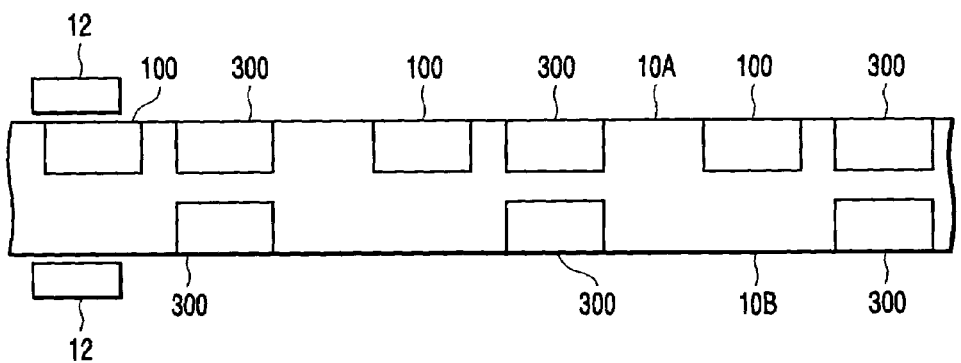
FIG. 16 is a view showing a state where product servo patterns have been written to both disk surfaces in the present embodiment.

FIG. 16 shows a state where the product patterns 300 have been written to both surfaces of the disk 10 using the corresponding first and second heads 12.

As described above, the timing pattern 100 has been previously written to the one surface of the disk 10. The timing pattern 100 is deleted by an overwrite process at data writing operation in the disk drive 1 to be shipped. In some cases, however, the timing pattern 100 that has been written to the innermost or outermost circumference of the disk 10 is left on the disk 10 without being deleted.

As described above, when a defect portion 120 such as a scratch exists on the disk surface, the additive servo pattern is written to the position away from the defect portion 120 in the disk circumferential direction. Therefore, the additive servowriting operation can be continued without being interrupted.

Another Embodiment

Figure 17:
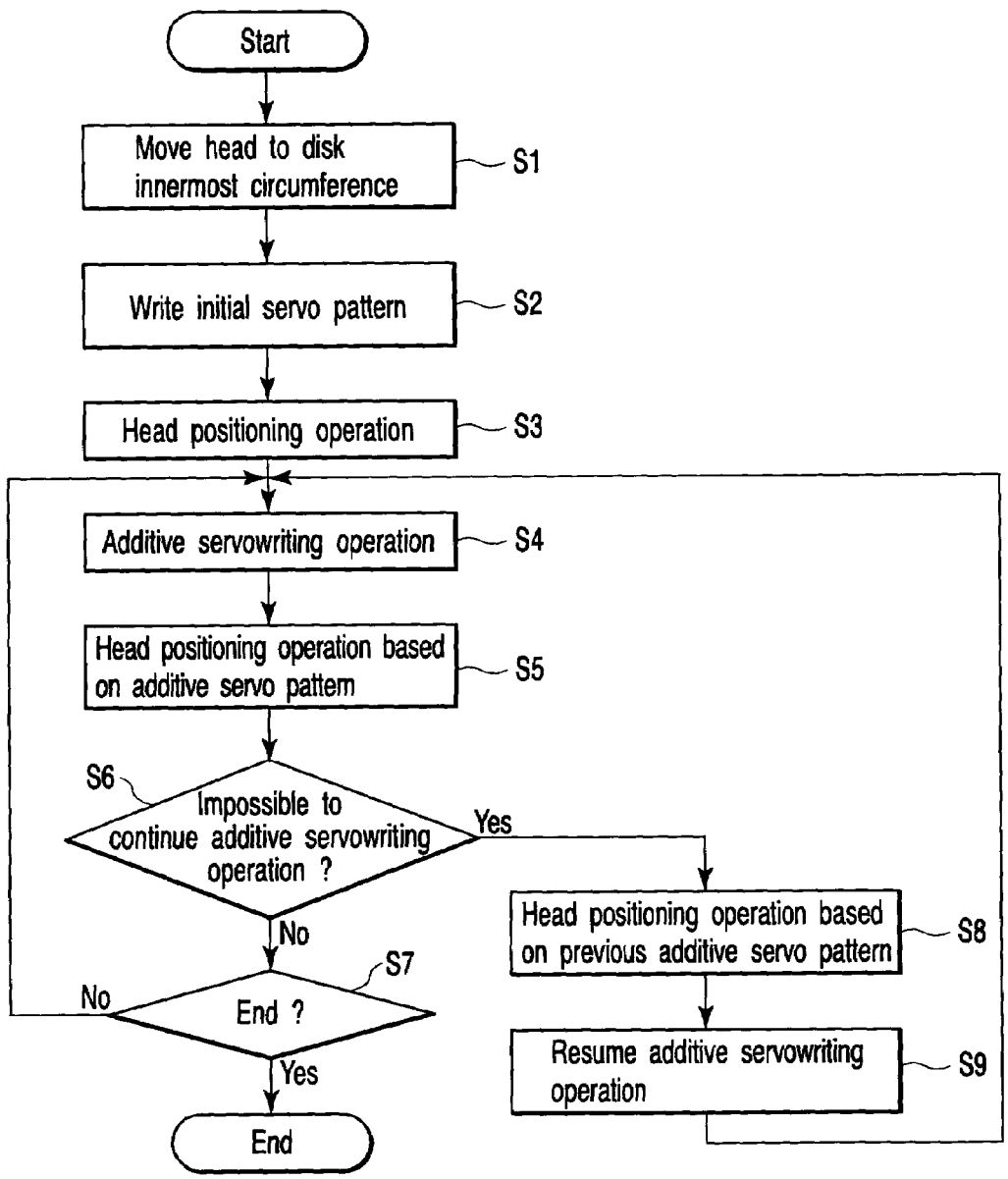
FIGS. 17 and 18 are flowcharts for explaining a procedure of the servowriting method in the present embodiment.

When signal quality of the additive servo pattern deteriorates in the middle of the writing operation of the servo pattern shown in FIG. 17, the read head element 12R cannot perform a correct tracking operation (positioning operation), disabling the following additive servowriting operation in some cases (Yes in step S6). On determining that it is impossible to perform the following servowriting operation, the servowriter 2 interrupts the additive servowriting operation.

Factors that degrade signal quality of the additive servo pattern are as follows.

FIGS. 9A to 9C, and FIG. 10 show a relationship between a conceptual configuration of the head positioning control system and disturbance in the additive servowriting operation.

As shown in FIGS. 9A to 9C, in the additive servowriting method, the previously written servo pattern 92A is read by the read head element 12R to perform a tracking operation (positioning operation) to position an actuator system 86 at the next target position. Then a new additive servo pattern 92B is written by the positioned write head element 12W.

Subsequently, the new additive servo pattern 92B is read by the read head element 12R as the previous servo pattern 92A, and the following additive servowriting operations are repeated in the same manner as described above.

As described above, the disk drive 1 is influenced by shaking (in other words, vibration of the disk 10) of the SPM 11 (NRRO), wind disturbance, error noise generated depending on the magnetic signal quality of the servo pattern read by the read head element, or the like.

In the additive servowriting method, the additive servowriting operation is performed based on the tracking operation to the previous servo pattern. Therefore, when the accuracy in the new additive servo pattern 92B deteriorates, the writing accuracy in the following additive servo patterns deteriorate every time the additive servowriting operation is performed, as shown in FIG. 10. In particular, when an extremely high NRRO rate is generated or a sudden disturbance such as an impact shock is applied from the outside, the accuracy in the additive servo pattern significantly deteriorates. FIG. 7 shows a state where the writing accuracy in the additive servo pattern 200M has significantly deteriorated due to a disturbance applied during the additive servowriting operation.

As described above, when signal quality of the additive servo pattern (200M) deteriorates in the middle of the additive servowriting operation, the servowriter 2 of this embodiment determines that it is impossible to continue the additive servowriting operation and interrupts the additive servowriting operation (Yes in step S6).

In the case where the servowriter 2 reads the additive servo pattern to perform a tracking operation (positioning operation) of the read head element 12R, when the generated positional error exceeds an allowable range, the head positioning control unit 22 of the servowriter 2 determines that it is impossible to continue the additive servowriting operation. That is, it is determined that the additive servo pattern 200M showing deteriorated accuracy has been written, as shown in FIG. 7, during the additive servowriting operation.

The servowriter 2 allows the head positioning control unit 22 to set back the head 12 so as to position the read head element 12R to the additive servo pattern 200 that was written before the additive servo pattern 200M, as shown in FIG. 8 (step S8).

The servowriter 2 then resumes the additive servowriting operation to allow the write head element 12W that has been positioned based on the previous correct additive servo pattern 200 to rewrite the additive servo pattern (step S9).

The servowriter 2 firstly deletes all the additive servo patterns 200M or portions that show deteriorated accuracy at the start of the resumption process of the additive servowriting operation. Thereafter, the servowriter 2 performs the additive servowriting operation to write a correct additive servo pattern 200 in place of the additive servo pattern 200M.

As described above, when the additive servo pattern 200M whose writing accuracy deteriorated during the additive servowriting operation due to influence of, for example, a sudden disturbance has been written, the servowriter 2 according to another embodiment interrupts the additive servowriting operation and sets back the position of the head 12 to the additive servo pattern 200 that was written before the servo pattern 200M. The servowriter 2 then performs a tracking operation to position the read head element 12R to the writing position of the previous additive servo pattern 200 to position the write head element 12W at the next writing position, thereby resuming the additive servowriting operation for rewriting the additive servo pattern. Therefore, it is possible to improve the writing accuracy by rewriting the additive servo pattern whose writing accuracy has deteriorated, preventing the additive servowriting operation from being interrupted in the middle of the operation.

According to the servowriting method according to the embodiments of the present invention, even when signal quality of the additive servo pattern deteriorates, interruption of the additive servowriting operation can be prevented, thereby reducing a decrease in efficiency in the servowrite process.

In the above embodiments, the additive servowriting operation is performed from the innermost to outermost circumference of the disk 10. The present invention is by no means limited thereto. Alternatively, however, the present invention can be applied to the case where the additive servowriting operation is performed from the outermost to innermost circumference of the disk 10.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of writing servo pattern data in a disk drive having a disk medium on which timing pattern data for determining writing timing is recorded, and a head with read/write head elements, the method comprising the steps of:

moving the head to an initial position on the disk medium;

writing, with the write head element, initial servo pattern data to the initial position based on the timing pattern data read by the read head element;

performing additive servowriting operation in which additive servo pattern data is sequentially written in such a manner that first additive servo pattern data is written with the write head element that has been positioned based on the initial servo pattern data read by the read head element, and second additive servo pattern data is written based on the first additive servo pattern data that has been written;

determining whether it is impossible to continue the additive servowriting operation;

interrupting the additive servowriting operation when it has been determined that it is impossible to continue the additive servowriting operation;

resuming the additive servowriting operation after moving the head to the position of the additive servo pattern data that has been written before the interruption; and deleting all or part of the additive servo pattern data that was being written at the time of the determination that it is impossible to continue the additive servowriting operation, wherein the resumption step changes writing timing of the write head element based on the timing pattern data after writing operation of the additive servo pattern data corresponding to one circuit of the disk medium has been interrupted in the middle of the operation and resumes writing operation of the additive servo pattern data from a position different from the interruption position in the disk circumferential direction.

2. A disk drive comprising:

a disk medium on which timing pattern data for determining writing timing is recorded;

a head with read/write head elements which are out of alignment with each other such that one element is relatively positioned on the inner or outer circumferential side with respect to the other element;

an actuator for moving the head in the radial direction of the disk medium; and a servowriter that controls the actuator to write servo pattern data for positioning the head on the disk medium, the servowriter including:

a unit that performs additive servowriting operation to sequentially write servo pattern data from an initial position on the disk medium with the write head element based on the timing pattern data read by the read head element;

a determination unit that determines whether it is impossible to continue the additive servowriting operation; and a resumption unit that interrupts the additive servowriting operation when it is determined by the determination unit that it is impossible to continue the additive servowriting operation, and resumes the additive servowriting operation after moving the head to the position of the additive servo pattern data that is written before the interruption, in which the resumption unit changes writing timing of the write head element based on the timing pattern data after writing operation of the additive servo pattern data corresponding to one circuit of the disk medium is interrupted in the middle of the operation and resumes writing operation of the additive servo pattern data from a position different from the interruption position in the disk circumferential direction.

3. The disk drive according to claim 2, wherein the determination unit determines that it is impossible to continue the additive servowriting operation in the case where a positional error calculated based on the additive servo pattern data read by the read head element exceeds an allowable value in the head positioning operation performed at the additive servowriting operation.

4. The disk drive according to claim 2, wherein the resumption unit deletes all or part of the additive servo pattern data that was being written when the determination unit has determined that it is impossible to continue the additive servowriting operation.

5. The disk drive according to claim 2, wherein the resumption unit overwrites additive servo pattern data on the additive servo pattern data that was being written when the determination unit has determined that it is impossible to continue the additive servowriting operation.

6. The disk drive according to claim 2, wherein the resumption unit sets back the head from the interruption position to the position at which the additive servo pattern data that is written before the determination is read by the read head element and resumes writing of the additive servo pattern data at the position with the write head element.

7. The disk drive according to claim 2, wherein the servowriter further comprises a unit that writes servo pattern data used in data read or write operation in the disk drive in accordance with the head positioning operation using the additive servo pattern data, in addition to the additive servo pattern data.

* * * * *